(12) United States Patent
Navarro Fructuoso et al.

(10) Patent No.: US 11,470,289 B2
(45) Date of Patent: Oct. 11, 2022

(54) RETINAL DISPLAY APPARATUS AND METHOD

(71) Applicant: Huawei Technologies Co., Ltd., Shenzhen (CN)

(72) Inventors: Hector Navarro Fructuoso, Munich (DE); Bogdan Cihodariu Ionita, Munich (DE); Atanas Boev, Munich (DE); Panji Setiawan, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/140,808

(22) Filed: Jan. 4, 2021

(65) Prior Publication Data

US 2021/0227186 A1 Jul. 22, 2021

Related U.S. Application Data

(63) Continuation of application No. PCT/EP2018/067823, filed on Jul. 2, 2018.

(51) Int. Cl.
*H04N 9/31* (2006.01)
*G02B 27/01* (2006.01)
*G06F 3/01* (2006.01)

(52) U.S. Cl.
CPC ......... *H04N 9/317* (2013.01); *G02B 27/0172* (2013.01); *G06F 3/013* (2013.01); *H04N 9/3138* (2013.01); *G02B 2027/0123* (2013.01); *G02B 2027/0178* (2013.01)

(58) Field of Classification Search
CPC .. H04N 9/317; H04N 9/3138; G02B 27/0172; G02B 2027/0123; G02B 2027/0178; G02B 26/101; G06F 3/013

USPC ......................................................... 348/745
See application file for complete search history.

(56) References Cited

U.S. PATENT DOCUMENTS

| | | | |
|---|---|---|---|
| 9,958,682 B1 | 5/2018 | Moore et al. | |
| 2011/0051091 A1* | 3/2011 | Song ................. | G02B 27/0172 353/121 |
| 2016/0033771 A1* | 2/2016 | Tremblay ............... | G02B 26/10 359/851 |

(Continued)

FOREIGN PATENT DOCUMENTS

| | | |
|---|---|---|
| CN | 101359089 A | 2/2009 |
| CN | 104808340 A | 7/2015 |

(Continued)

OTHER PUBLICATIONS

Lin et al., "Retinal projection head-mounted display," Front. Optoelectron. 10(1), pp. 1-8, Higher Education Press and Springer-Verlag Berlin Heidelberg 2016 (2017).

(Continued)

*Primary Examiner* — Michael Lee
(74) *Attorney, Agent, or Firm* — Leydig, Voit & Mayer, Ltd.

(57) ABSTRACT

The disclosure relates to a retinal display apparatus for generating an image on the retina of an eye of a user, wherein the retinal display apparatus is configured to generate multiple light beams, each light beam conveying an instance of the image, wherein the multiple light beams correspond one-to-one to multiple potential orientations of the eye of the user. Moreover, the disclosure relates to a corresponding method.

13 Claims, 11 Drawing Sheets

(56) References Cited

U.S. PATENT DOCUMENTS

| | | | |
|---|---|---|---|
| 2016/0147078 A1 | 5/2016 | Bedard et al. | |
| 2016/0377866 A1* | 12/2016 | Alexander | G09G 3/001 345/8 |
| 2016/0377867 A1 | 12/2016 | Kessler | |
| 2017/0255012 A1 | 9/2017 | Tam et al. | |
| 2018/0113311 A1* | 4/2018 | Klug | G02B 27/0179 |
| 2018/0246336 A1* | 8/2018 | Greenberg | G02B 27/0179 |
| 2018/0373024 A1* | 12/2018 | Sugawara | G09G 3/346 |
| 2019/0324272 A1* | 10/2019 | Seo | G02B 27/0093 |
| 2020/0088931 A1 | 3/2020 | Urness et al. | |

FOREIGN PATENT DOCUMENTS

| | | |
|---|---|---|
| CN | 107820578 A | 3/2018 |
| JP | 2004102204 A | 4/2004 |

OTHER PUBLICATIONS

"DLP Technology for Near Eye Display, Application Report," Texas Instruments Incorporated, Literature No. DLPA051A, Total 18 pages (Sep. 2014—Revised Aug. 2017).

Kramida, "Resolving the Vergence-Accommodation Conflict in Head-Mounted Displays," IEEE Transactions on Visualization and Computer Graphics, vol. 22, No. 7, pp. 1912-1931, Institute of Electrical and Electronics Engineers, New York, New York (Jul. 2016).

Lambooij et al., "Visual Discomfort and Visual Fatigue of Stereoscopic Displays: A Review," Journal of Imaging Science and Technology, vol. 53, No. 3, pp. 1-14, Society of Imaging and Technology (2009).

Hu et al., "Design and Assessment of a Depth-Fused Multi-Focal-Plane Display Prototype," Journal of Display Technology, vol. 10, No. 4, pp. 308-316, Institute of Electrical and Electronics Engineers, New York, New York (Apr. 2014).

Wu et al., "Content-Adaptive Focus Configuration for Near-Eye Multi-Focal Displays," 2016 IEEE International Conference on Multimedia and Expo (ICME), pp. 1-6, Institute of Electrical and Electronics Engineers, New York, New York (Jul. 2016).

Narain et al., "Optimal Presentation of Imagery with Focus Cues on Multi-Plane Displays," ACM Transactions on Graphics, vol. 34, No. 4, Article 59, Total 12 pages (Aug. 2015).

Shibata et al., "The zone of comfort: Predicting visual discomfort with stereo displays," Journal of Vision, vol. 11, No. 3, pp. 1-53 (Jul. 2011).

* cited by examiner

RETINAL DISPLAY APPARATUS AND METHOD

CROSS-REFERENCE TO RELATED APPLICATIONS

This application is a continuation of International Application No. PCT/EP2018/067823, filed on Jul. 2, 2018, the disclosure of which is hereby incorporated by reference in its entirety.

TECHNICAL FIELD

Generally, the present disclosure relates to the field of personal display devices. More specifically, the disclosure relates to a retinal display apparatus and method.

BACKGROUND

Personal display devices make it possible to provide image content to a viewer in applications where the use of conventional display screens would be an encumbrance. Head-mounted display (HMD) devices (also referred to as near-eye display (NED) or near-to-eye (NTE) devices), such as display goggles, are being considered as a useful type of wearable personal display device usable in a variety of fields, with applications ranging from military, medical, dental, industrial, and game presentation, among others.

It is known that Maxwellian HMDs (also referred to as retinal display devices) offer an accommodation-free display which allows a user to steadily observe both real and virtual objects, a key feature which cannot be provided by conventional HMDs. However, conventionally a Maxwellian view is limited by its extremely narrow field of view that requires the beam to converge precisely at the center of the crystalline lens. This narrow field of view is insufficient to provide a convenient user viewing experience and thus limiting the deployment of such technology.

Lin, J. et al., "Retinal projection head-mounted display", in Journal of Frontiers of Optoelectronics, 10(1): 1-8, 2017 discloses a so-called modified Maxwellian view for expanding the field of view to a certain extent. However, the suggested approach neglects the crystalline accommodation, narrows the pupil aperture, and reduces the view angle field.

Thus, there is still a need for an improved retinal display apparatus and method providing a larger field of view for a user.

SUMMARY

Embodiments of the disclosure are defined by the features of the independent claims, and further advantageous implementations of the embodiments by the features of the dependent claims.

According to a first aspect the disclosure relates to a retinal display apparatus for generating an image on the retina of an eye of a user. The retinal display apparatus is configured to generate multiple light beams, wherein each light beam conveys an instance of the image and wherein the multiple light beams correspond one-to-one to multiple potential orientations of the eye of the user.

Thus, an improved retinal display apparatus is disclosed providing a user with a larger field of view. More specifically, embodiments of the disclosure extend the field of view by having a set of exit pupils and (simultaneously) generating a replica of the image at each exit pupil. The exit pupil configuration can be chosen to minimize the double image artifact. Thus, embodiments of the disclosure provide a Maxwellian optical system with an extended field of view for Augmented Reality (AR), Virtual Reality (VR), or Mixed Reality applications by having several exit pupils. Embodiments of the disclosure make use of micro-optical elements for simultaneously creating multiple image replicas and further utilize a free-form reflector to focus each of the replicas over a dedicated grid. In this way, when the eyeball of the observer rotates, there will always be one of the light beams directed toward the pupil of the eye.

As used herein, a beam is a collection of image light rays and a chief ray is the light ray coming from the central point of an image.

In a further possible implementation of the first aspect of the disclosure, the retinal display apparatus further comprises for each of the multiple light beams an aperture for transmitting the light beam.

In a further possible implementation of the first aspect of the disclosure, each of the multiple light beams is composed of a plurality of laser beams, wherein each of the laser beams corresponds to a pixel of the image.

In a further possible implementation of the first aspect of the disclosure, the retinal display apparatus is configured to generate the multiple light beams by splitting a primary light beam into the multiple light beams. For example, the retinal display apparatus may comprise a beam splitter unit having one or more beam splitters configured to split the primary light beam into the multiple light beams. The one or more beam splitters may comprise one or more mirrors configured to reflect the multiple light beams.

In a further possible implementation of the first aspect of the disclosure, the retinal display apparatus comprises a light engine configured to generate the primary light beam.

In a further possible implementation of the first aspect of the disclosure, the light engine comprises a laser.

In a further possible implementation of the first aspect of the disclosure, the retinal display apparatus comprises for each of the multiple light beams a reflector configured to reflect the respective light beam into a direction corresponding to one of the multiple potential orientations of the eye.

In a further possible implementation of the first aspect of the disclosure, the reflector is a free-form reflector. For example, the free-form reflector may comprise one or more of a curved mirror, a diffractive reflector or a holographic reflector. The free-form reflector may comprise a free-form surface being reflective and having an adjustable shape defined by a mapping to reflect and map a respective light beam. The reflective surface may be an optical reflective surface.

In a further possible implementation of the first aspect of the disclosure, the reflector is semi-transparent.

In a further possible implementation of the first aspect of the disclosure, the retinal display apparatus comprises for each of one or more of the light beams a prism, configured to compensate a rotation of the respective light beam. The prism may notably be a delta prism.

In a further possible implementation of the first aspect of the disclosure, a respective bottom face of the one or more prisms, in particular delta prisms, is coated with a reflecting material.

In a further possible implementation of the first aspect of the disclosure, the retinal display apparatus comprises one or more beam expanders.

In a further possible implementation of the first aspect of the disclosure, the multiple light beams have the same intensity.

In a further possible implementation of the first aspect of the disclosure, the multiple potential orientations of the eye define an array on the eye, in particular a hexagonal array on the eye.

In a further possible implementation form of the first aspect of the disclosure, the distance between two neighbouring orientations of the array of multiple potential orientations is in the range of a pupil size of a user's eye based on the lighting conditions of the target environment.

In a further possible implementation form of the first aspect of the disclosure, the retinal display apparatus further comprises processing circuitry configured to adjust the distance between two vertically or horizontally neighbouring orientations of the array of multiple potential orientations on the basis of an external brightness level.

In a further possible implementation form of the first aspect of the disclosure, the retinal display apparatus further comprises one or more optical path equalizers configured to adjust the optical paths of the multiple light beams to an optical path associated with the image.

Each of the above mentioned implementation forms is simple in design and yields good optical performance.

According to a second aspect the disclosure relates to a near eye display apparatus comprising one or more retinal display apparatuses according to the first aspect of the disclosure.

According to a third aspect the disclosure relates to a corresponding retinal display method, wherein the retinal display method comprises the step of generating an image on the retina of an eye of a user by generating multiple light beams, wherein each light beam conveys an instance of the image and wherein the multiple light beams correspond one-to-one to multiple potential orientations of the eye of the user.

The retinal display method according to the third aspect of the disclosure can be performed by the retinal display apparatus according to the first aspect of the disclosure. Further features of the retinal display method according to the third aspect of the disclosure result directly from the functionality of the retinal display apparatus according to the first aspect of the disclosure and its different implementation forms described above and below.

According to a fourth aspect the disclosure relates to a computer program product comprising program code for performing the method according to the third aspect when executed on a computer.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the disclosure are described in more detail with reference to the attached figures and drawings, in which.

In the following, identical reference signs refer to identical or at least functionally equivalent features.

DETAILED DESCRIPTION OF THE EMBODIMENTS

In the following description, reference is made to the accompanying figures, which form part of the disclosure, and which show, by way of illustration, specific aspects of embodiments of the disclosure or specific aspects in which embodiments of the disclosure may be used. It is understood that embodiments of the disclosure may be used in other aspects and comprise structural or logical changes not depicted in the figures. The following detailed description, therefore, is not to be taken in a limiting sense, and the scope of the disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
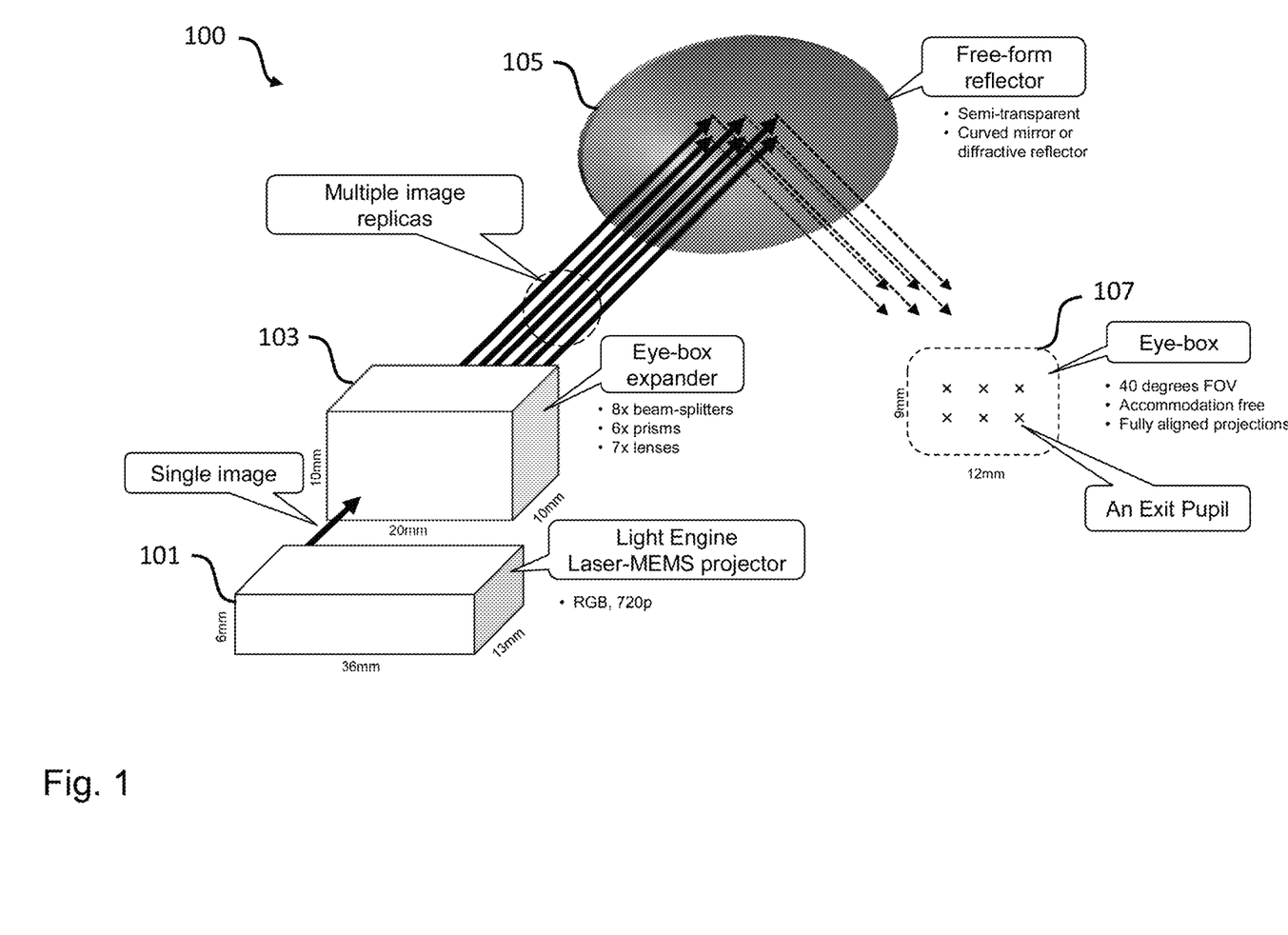
FIG. 1 is a schematic diagram showing an example of a retinal display apparatus according to an embodiment of the disclosure.

FIG. 1 shows an embodiment of a retinal display apparatus 100 based on an extended Maxwellian view configured to generate an image on the retina of an eye of a user. As will be described in more detail further below, the retinal display apparatus 100 is configured to generate multiple light beams, wherein each light beam conveys an instance of the image and wherein the multiple light beams correspond one-to-one to multiple potential orientations of the eye of the user. In an embodiment, the retinal display apparatus 100 can comprise for each of the multiple light beams an aperture for transmitting the light beam. In an embodiment, each of the multiple light beams can be composed of a plurality of laser beams, wherein each of the laser beams corresponds to a pixel of the image. In an embodiment, the retinal display apparatus 100 is configured to generate the multiple light beams by splitting a primary light beam into the multiple light beams.

The retinal display apparatus 100 shown in FIG. 1 generally comprises a light engine 101, a beam splitter unit 103 (referred to as eye-box expander in FIG. 1) and a free-form reflector unit 105.

The light engine 101 is configured to generate a single image collimated beam (a set of light rays), i.e. the primary light beam. In an embodiment, the light engine 101 can comprise a laser. As will be described in more detail in the context of FIG. 2, the beam splitter unit 103 can be based on micro-optics for creating multiple image replicas, preferably having the same intensity. As will be described in more detail further below, the beam splitter unit 103 is configured such that the generated number of image replicas is the same as the number of exit pupils. The free-form reflector unit 105 can comprise one or more free-form reflectors configured to reflect the respective light beam into a direction corresponding to one of the multiple potential orientations of the eye for "creating" the Maxwellian exit pupils inside an eye box 107.

Figure 2:
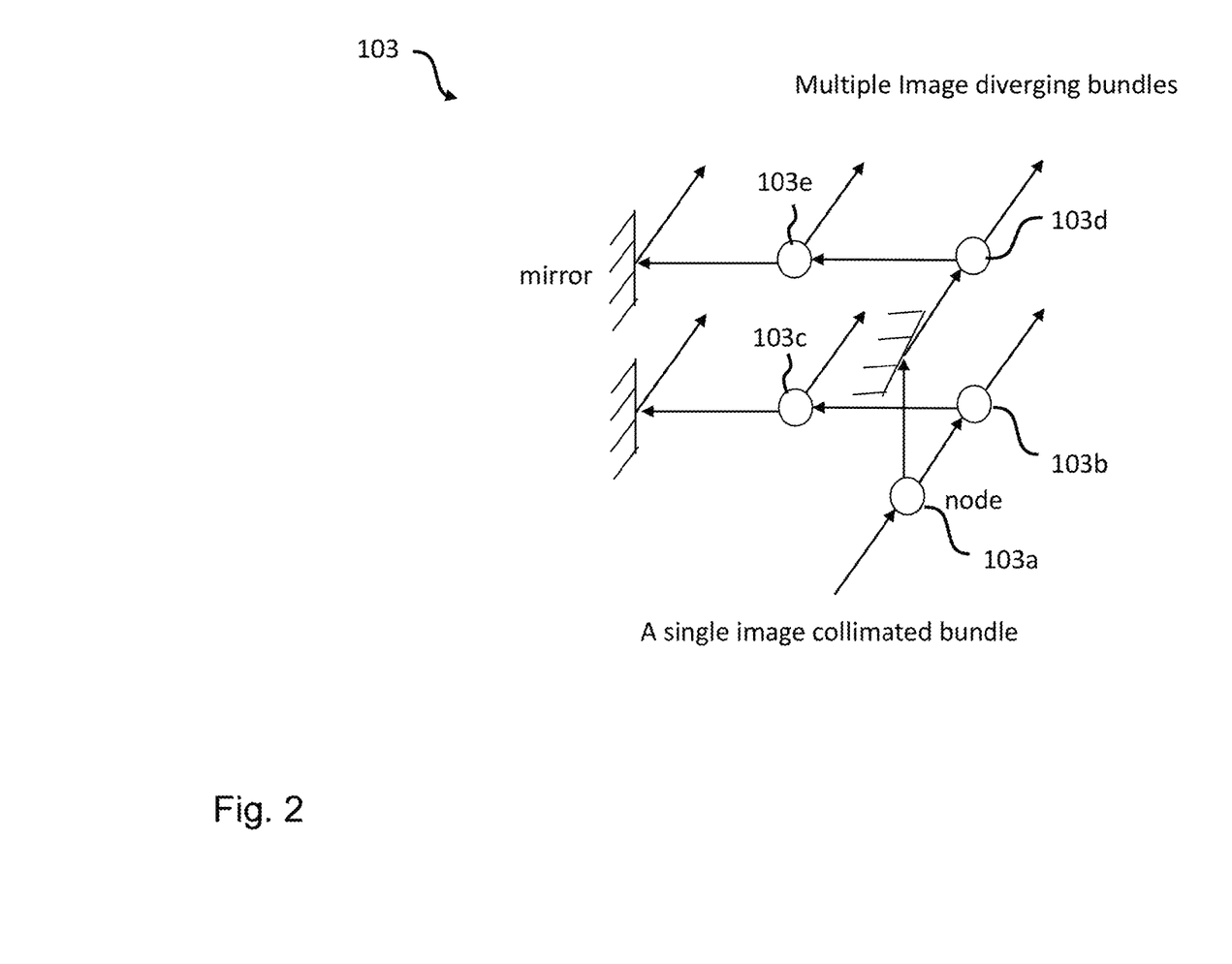
FIG. 2 is a schematic diagram showing details of a beam splitter unit of a retinal display apparatus according to an embodiment of the disclosure.

The beam splitter unit 103 can be based on the optical design illustrated in FIG. 2, where the beam splitter unit 103 is implemented using micro-optics. The beam splitter unit 103 shown in FIG. 2 comprises multiple beam splitters 103a-e of size, e.g., 2×2×2 mm and a plurality of mirrors, where each beam splitter 103a-e outputs up to two collimated beams or sets of light rays after receiving a single input collimated set of light rays. In an embodiment, the brightness of each exit pupil can be tuned by applying a coating on the surface of each beam splitter 103a-e. In an embodiment, the brightness of each exit pupil should be the same and an appropriate coating can be chosen to achieve this purpose.

Figure 3:
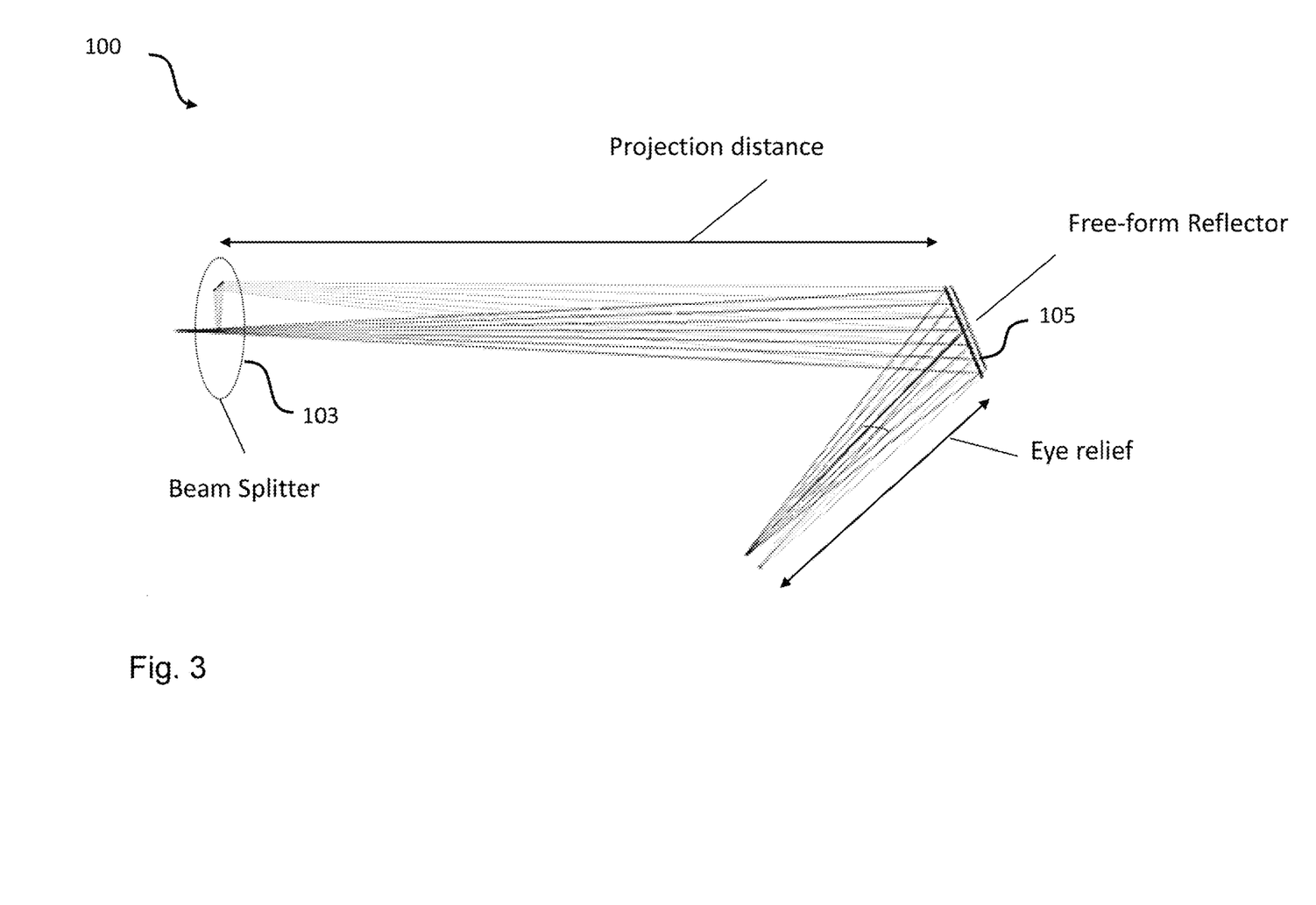
FIG. 3 is a schematic diagram showing illustrating different aspects of a retinal display apparatus according to an embodiment of the disclosure.

FIG. 3 illustrates an embodiment of the retinal display apparatus including the free-form reflector 105, which has an eye relief of a certain length, e.g. 2 cm, to achieve a field of view (FOV) having a certain size, e.g. 38 degrees, and a certain projection distance, e.g. 5 cm. FIG. 3 illustrates how the free-form reflector unit 105 allows creating the exit pupils after receiving two image replicas from the beam splitter unit 103.

Figure 4:
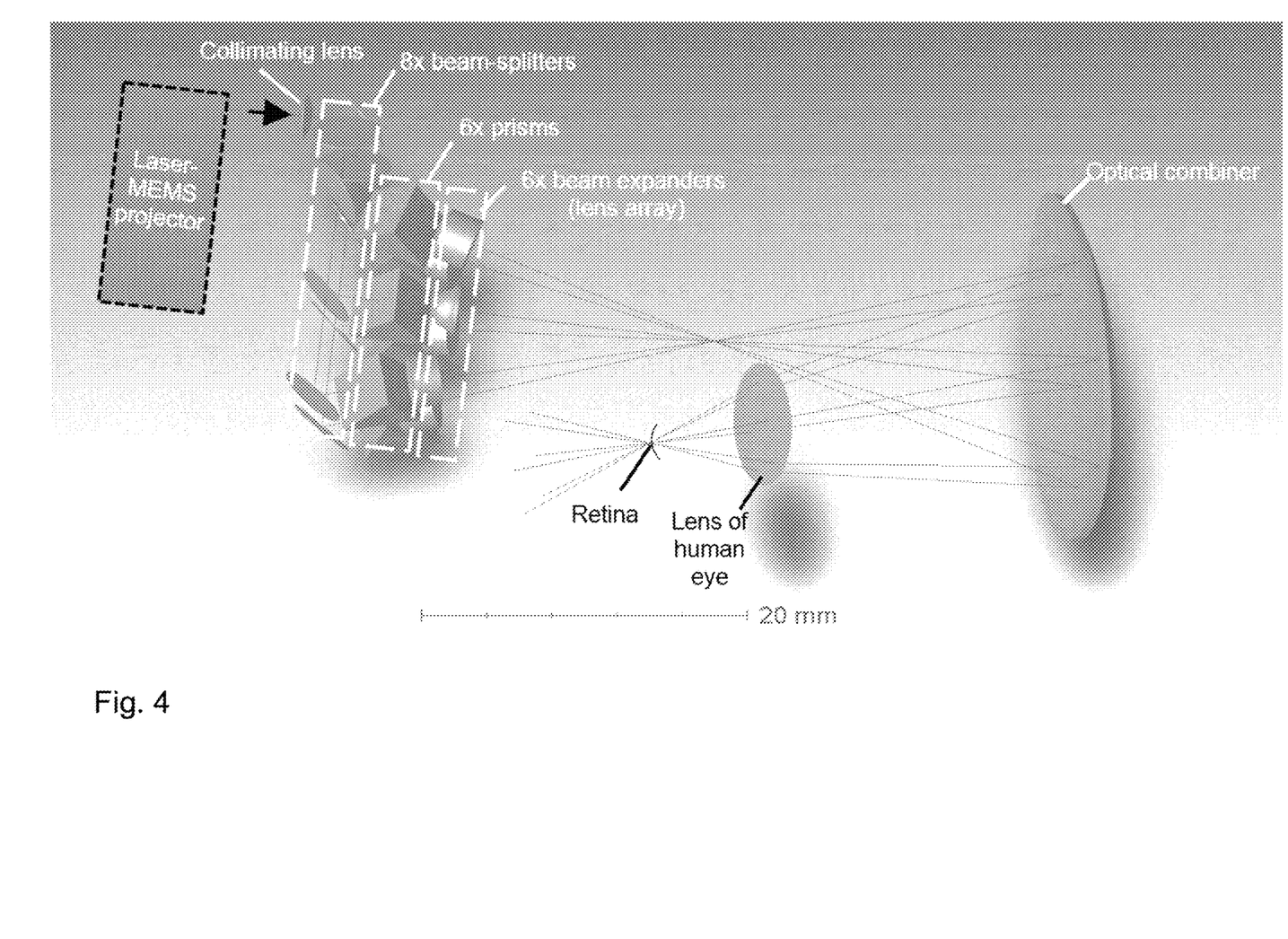
FIG. 4 is a schematic diagram showing an example of a retinal display apparatus according to an embodiment of the disclosure.

FIG. 4 illustrates a further embodiment of the retinal display apparatus 100, including micro-optical elements and the free-form reflector unit 105. In the embodiment shown in FIG. 4 the beam splitter unit 103 comprises 8 beam splitters for providing 6 exit pupils. The retinal display apparatus 100 shown in FIG. 4 further comprises 6 prisms 500, in particular delta prisms 500, wherein each prism 500 is located in the optical path of each of the image replicas downstream of the beam splitter unit 103. In the embodiment shown in FIG. 4, the (delta) prisms 500 can be used to compensate for the image rotation due to the reflections of the image caused by the beam splitters, in case the beam splitters are positioned at different angles. Furthermore, the retinal display apparatus 100 shown in FIG. 4 comprises 6 beam expanders 501, which are configured to transform the respective light beams provided by the (delta) prisms 500 into diverging light beams. In an embodiment, each beam expander 501 can comprise a lens or a lens array configured to provide a diverging light beam.

Figure 5:
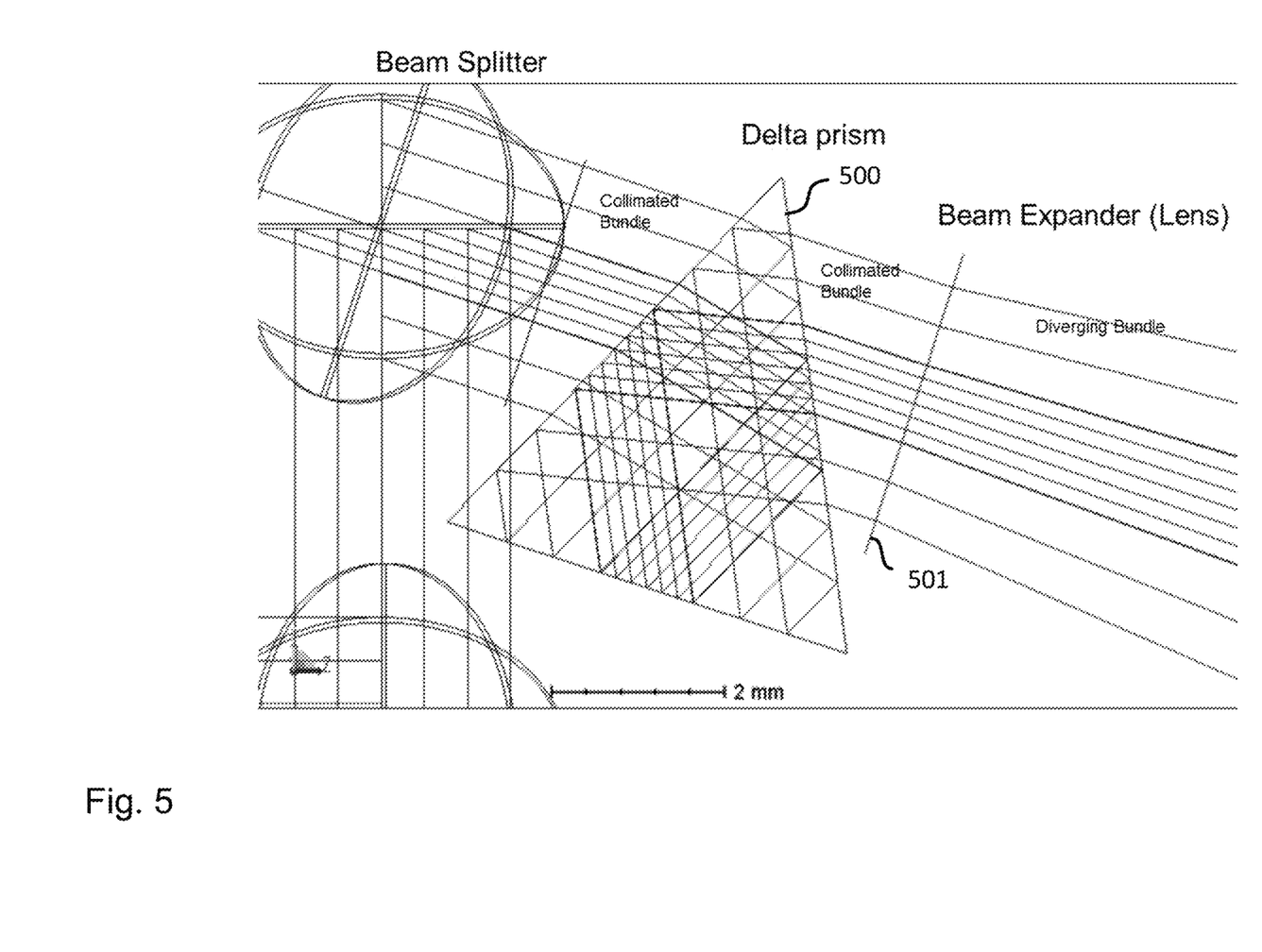
FIG. 5 is a schematic diagram showing details of the retinal display apparatus of FIG. 4.

As will be appreciated, the exact geometry of the (delta) prims 500 shown in FIG. 4 depends primarily on the refraction index of the material of each (delta) prism 500 as well as the size of the beam. In each (delta) prism 500 there are 3 reflections and 2 transmissions. The entrance and exit faces of each (delta) prism 500 also act as reflecting surfaces and hence total internal reflection should occur at these 2 faces. In an embodiment, the bottom face of each (delta) prism 500 acts as a reflecting surface. In an embodiment, this surface can be coated with a reflecting material, as the angle of incidence on this face can be small. A detailed view of the optical light paths provided by the (delta) prism 500 used in the retinal display apparatus 100 according to an embodiment is shown in FIG. 5, which also shows at least partially two beam splitters and one beam expander 501 located in the vicinity of the exit face of the (delta) prism 500 for diverging the collimated light beam provided by the (delta) prism 500.

Figure 6:
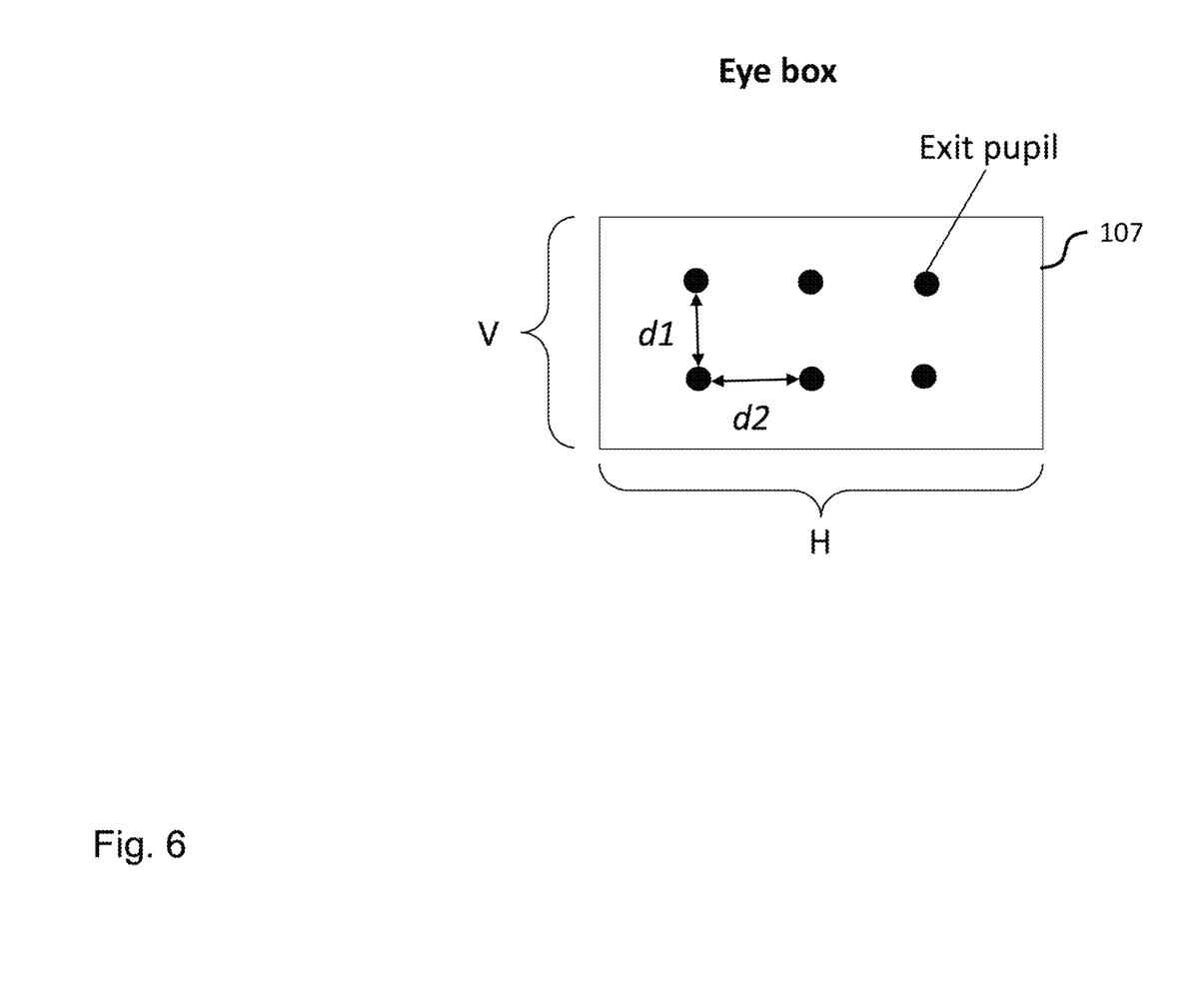
FIG. 6 is a schematic diagram showing an example of an eye-box provided by a retinal display apparatus according to an embodiment of the disclosure.

FIG. 6 illustrates an exit pupil configuration, i.e. the multiple potential orientations of the eye, provided by the retinal display apparatus 100 according to an embodiment. In the embodiment shown in FIG. 6, the eye box 107 comprises an array of 6 exit pupils, i.e. multiple potential orientations of the eye, with 2 horizontal rows of 3 exit pupils in each horizontal row. By way of example, the eye box 107 shown in FIG. 6 can have a horizontal size of 12 mm and a vertical size of 9 mm. By way of example, the horizontal distance d2 and the vertical distance d1 between neighboring exit pupils, i.e. neighboring orientations of the eye, can be d2=d1=3 mm. In an embodiment, the horizontal distance d2 and the vertical distance d1 can be different. In an embodiment, the array of exit pupils can be arbitrarily distributed on 2D space, such as irregular, hexagonal, and the like.

In an embodiment, the distance between two neighboring orientations of the array of multiple potential orientations is in the range of a pupil size of a user's eye based on the lighting conditions of the target environment. In an embodiment, the retinal display apparatus 100 can further comprise processing circuitry configured to adjust the distance between two neighboring orientations of the array of multiple potential orientations on the basis of an external brightness level.

Figure 7:
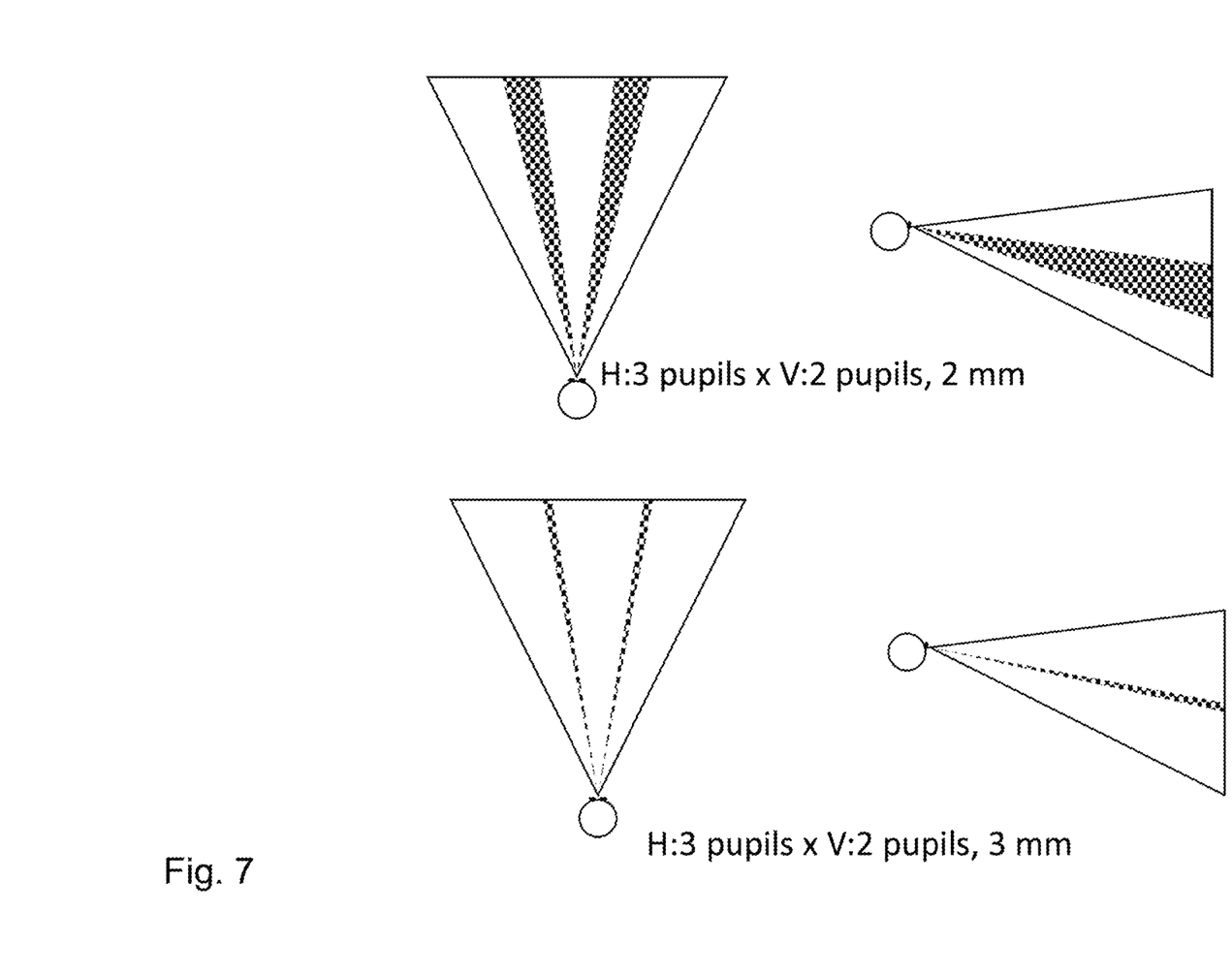
FIG. 7 is a schematic diagram illustrating the occurrence of optical artefacts for different embodiments of the retinal display apparatus.

FIG. 7 illustrates the dependency of optical artefacts within the viewing area of the retinal display apparatus 100 according to an embodiment on the spatial configuration of the array of exit pupils shown in FIG. 6. For an exemplary size of the eye pupil of d=3 mm and a total of 6 exit pupils with the spatial configuration shown in FIG. 6, the shaded regions of FIG. 7 indicate areas where optical artefacts may occur, as determined by computer simulations. The upper half of FIG. 7 illustrates the top and lateral view of the shaded area when the exit pupils are separated by a vertical and horizontal distance of 2 mm. The lower half of FIG. 7 illustrates the top and lateral view of the shaded area when the exit pupils are separated by a vertical and horizontal distance of 3 mm. As will be appreciated, for this embodiment of the retinal display apparatus 100 for a separation by 3 mm the optical artefacts are smaller than for a separation by 2 mm so that a separation of 3 mm is preferred in this case.

Figure 8:
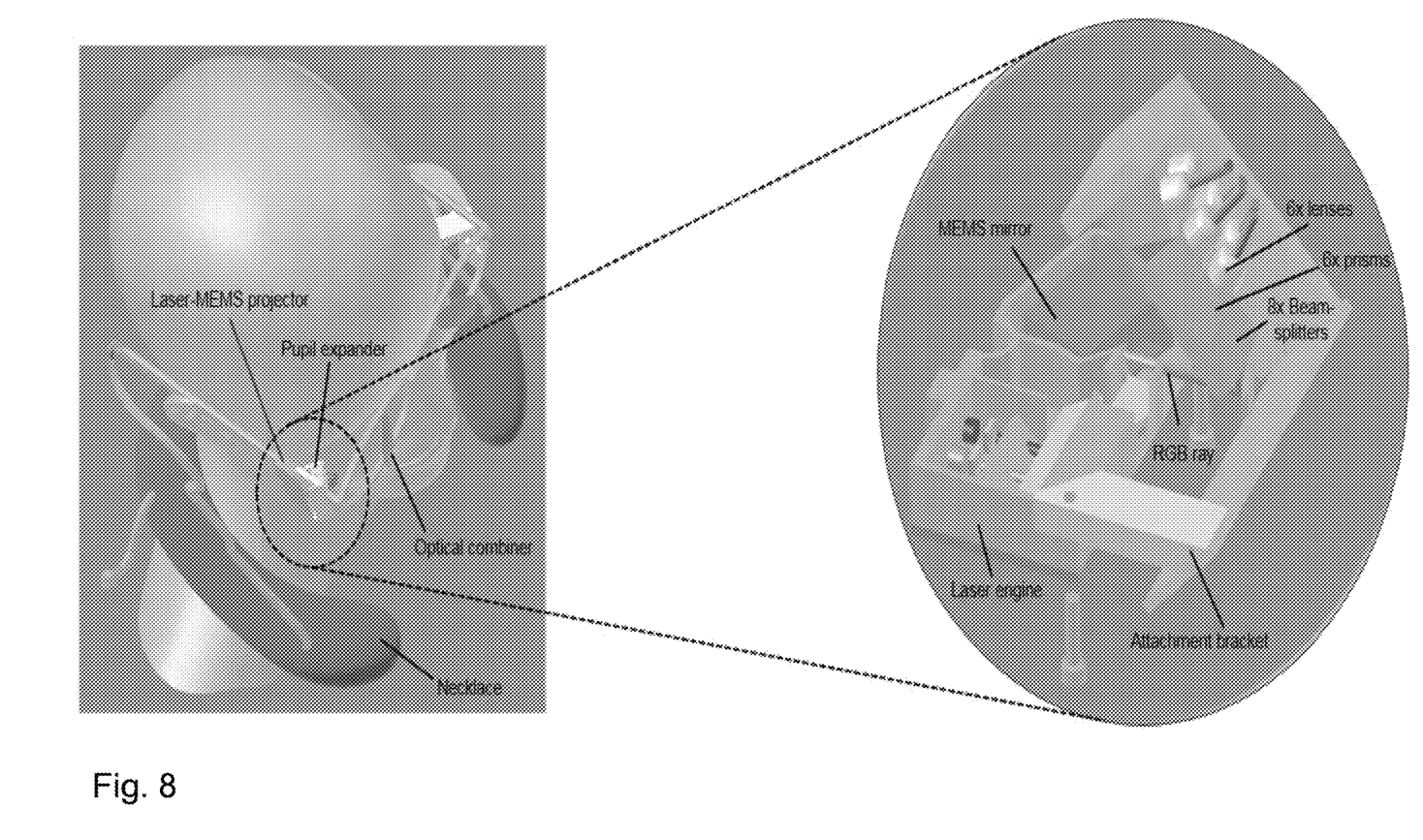
FIG. 8 is a schematic diagram showing an example of near eye display apparatus comprising a retinal display apparatus according to an embodiment of the disclosure.

FIG. 8 shows an implementation of an embodiment of the retinal display apparatus 100 as part of a near-eye display apparatus in the form of glasses. In FIG. 8 the free-form reflector unit 105 is referred to as "optical combiner" and the beam-splitter unit 103, i.e. eye-box expander is referred to as "pupil expander".

Figure 9:
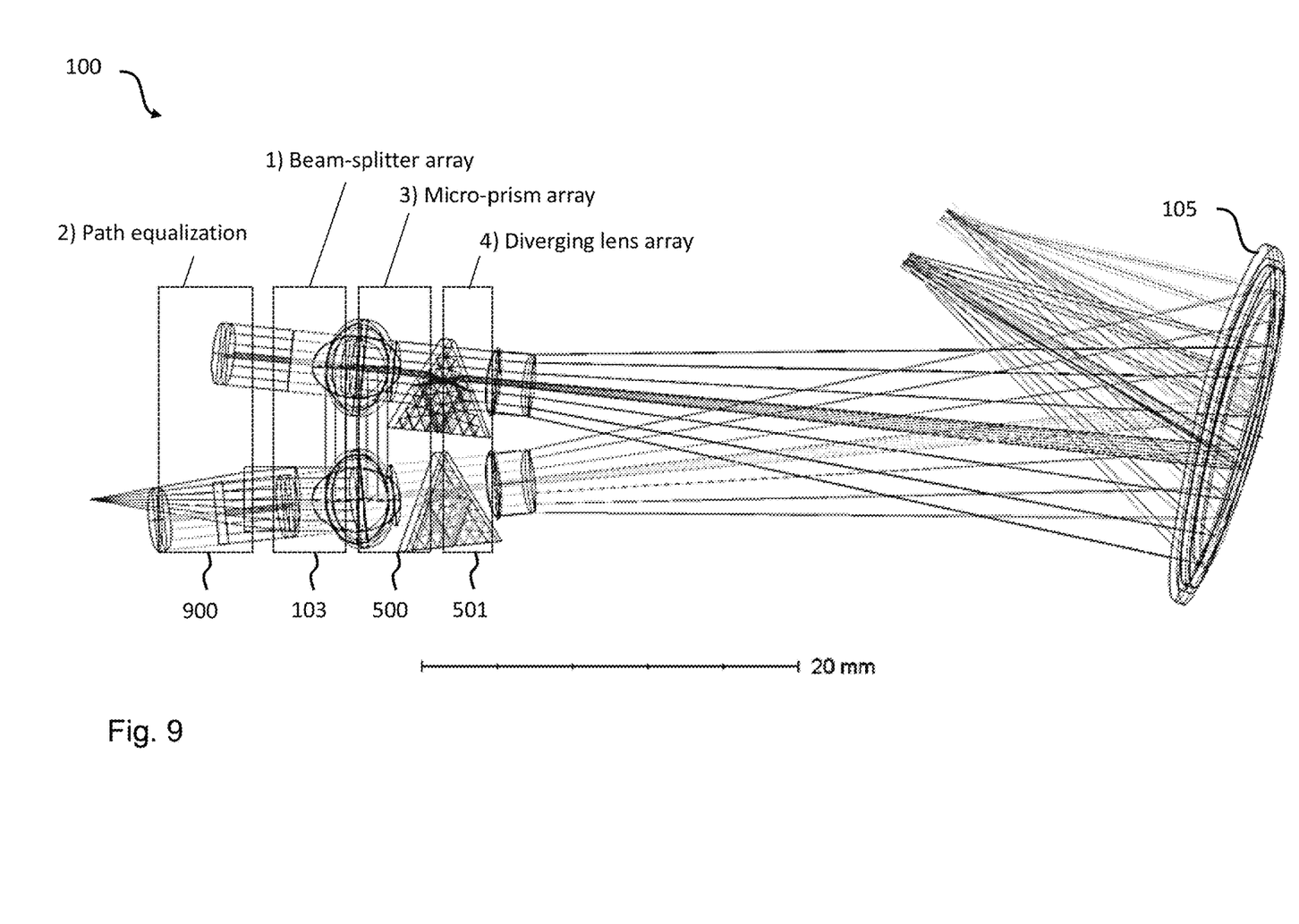
FIG. 9 is a schematic diagram showing an example of a retinal display apparatus according to an embodiment of the disclosure.
Figure 10:
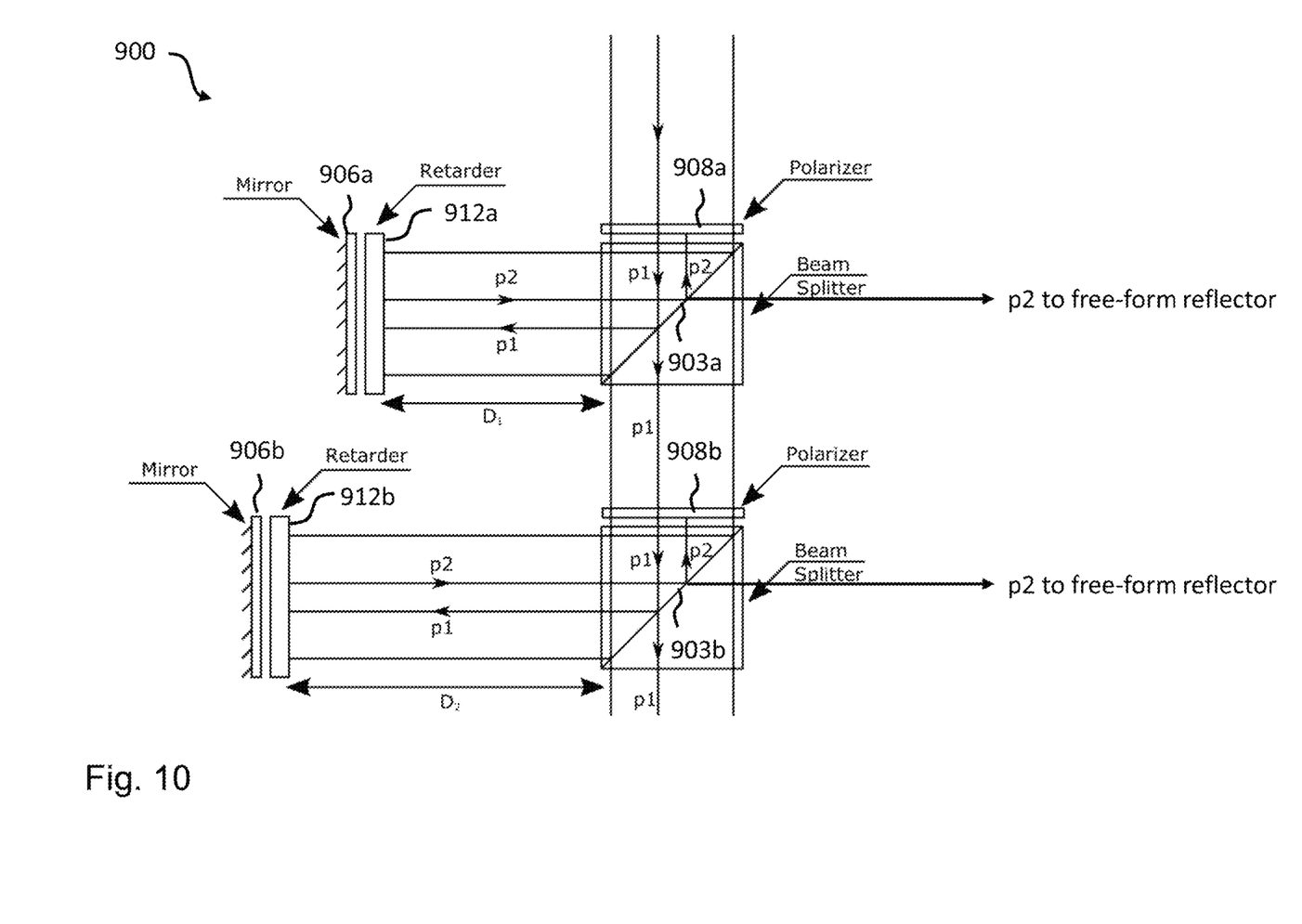
FIG. 10 is a schematic diagram showing details of the retinal display apparatus of FIG. 9.

FIG. 9 shows aspects of a further embodiment of the retinal display apparatus 100, which is a modification of the embodiment shown in FIG. 4 in that the retinal display apparatus 100 of FIG. 9 further comprises one or more path equalizers 900. For the embodiment of the retinal display apparatus 100 shown in FIG. 4 the lens in front of the laser is responsible for adjusting the convergence or divergence of the beam and the position of the beam waist. This adjustment, together with the rest of the components of the beam expander and the free-form reflector, determine the spot size over the retina of the user. There is a difference for the optical path of the laser beam for each of the configurations (as will be appreciated from the laser emitter to the reflector, for each of the beam splitter configurations, the distance that the light beam travels is different). According to an embodiment, for minimizing the spot size over the retina of the user the optical paths for each of the configurations can be equalized. In an embodiment, this can be achieved by adding an extra path (for example, the extra path D1 and the extra path D2 illustrated in FIG. 10) to each of the configurations except one, so that the optical path is the same for all of them. As will be appreciated from FIG. 10, a respective beam splitter 903a, 903b is used to split the beam, then it propagates for a certain distance, and is reflected by a respective mirror 906a, 906b that sends back the light to the beam splitter 903a, 903b, and then to the reflector. In an embodiment, the position of the mirror 906a, 906b (i.e. the distances D1 and D2) can be determined so that the optical path for all the configurations is the same. This is referred to as path equalization as implemented by the path equalizers 900.

Additionally, due to possible (unwanted) reflections in the beam splitters 903a, 903b from different configurations, it can happen that the user will see simultaneously on each exit pupil, one or more out of focus replicas of the same image. In order to avoid this kind of potential crosstalk, according an embodiment an optical isolator for each of the configurations can be used. By way of example, in the embodiment shown in FIG. 10 the retinal display apparatus 100 comprises an optical isolator in form of a respective polarizer 908a, 908b located in front of the respective beam splitter 903a, 903b. Light, after passing through the respective polarizer 908a, 908b, has a polarization state p1. When the light beam passes through a respective retarder 912a, 912b, it is reflected by the mirror 906a, 906b and passes again through the retarder 912a, 912b, whereby the polarization state changes to p2, which is now orthogonal to p1. Now the light beam reaches the beam splitter 903a, 903b, wherein part of the light goes to the reflector, and part is back reflected to the source (or to the previous configuration). When the light reaches the polarizer 908a, 908b, which now acts as an analyzer, the reflection is filtered out.

Figure 11:
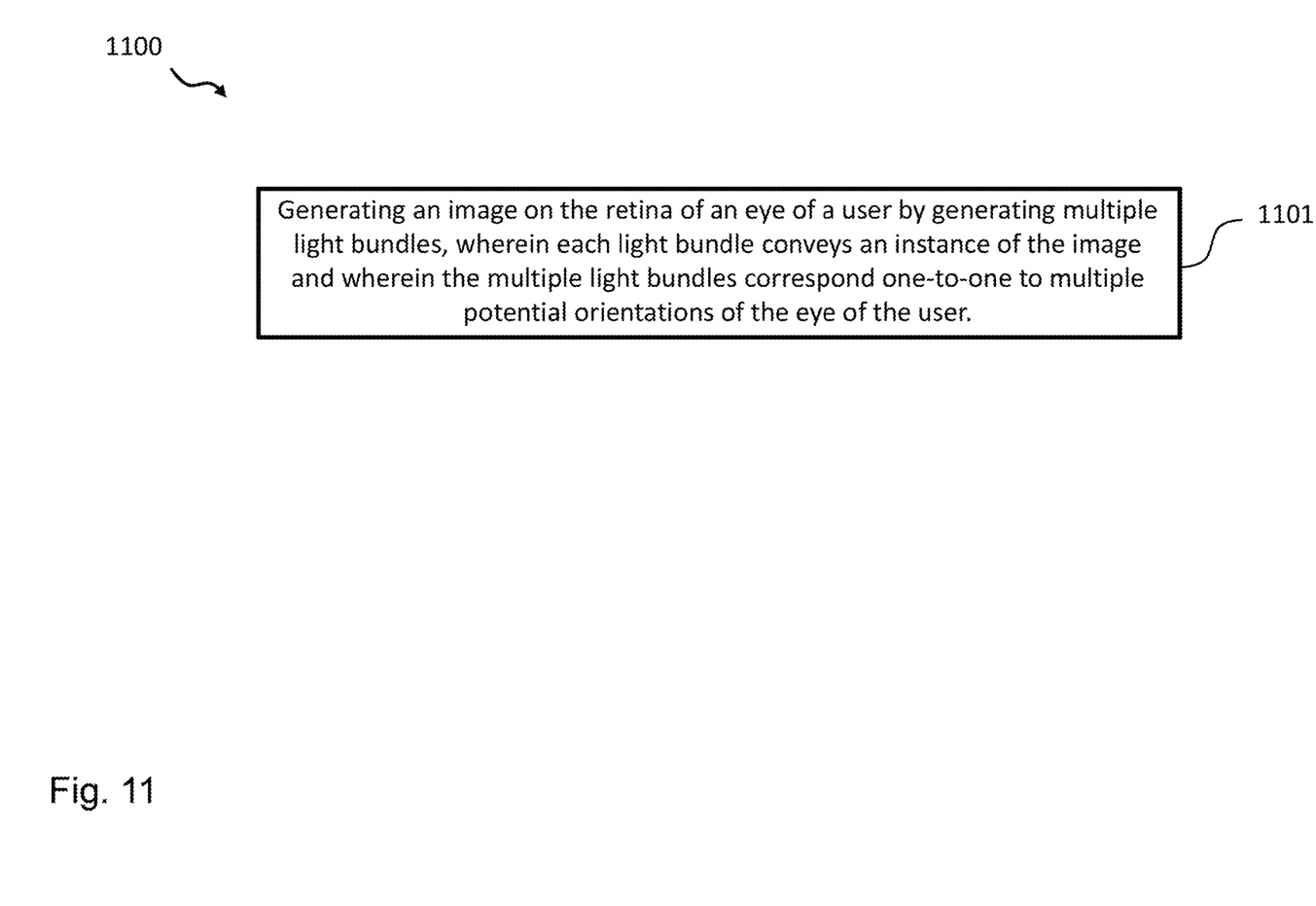
FIG. 11 is a flow diagram showing an example of a retinal display method according to an embodiment of the disclosure.

FIG. 11 is a flow diagram showing an example of a corresponding retinal display method 1100 according to an embodiment of the disclosure. The retinal display method 1100 comprises the step 1101 of generating an image on the retina of an eye of a user by generating multiple light beams, wherein each light beam conveys an instance of the image and wherein the multiple light beams correspond one-to-one to multiple potential orientations of the eye of the user. Further embodiments of the retinal display method 1100 are based on the above embodiments of the corresponding retinal display apparatus 100.

The person skilled in the art will understand that the "blocks" ("units") of the various figures (method and apparatus) represent or describe functionalities of embodiments of the disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the disclosure may be integrated into one processing unit, or each of the units may exist alone physically, or two or more units are integrated into one unit.

What is claimed is:

1. A retinal display apparatus for generating an image on the retina of an eye of a user, wherein the retinal display apparatus is configured to generate a plurality light beams, each light beam conveying an instance of the image, and wherein the plurality light beams correspond one-to-one to a plurality of orientations of the eye of the user, wherein the plurality potential orientations of the eye define a hexagonal array on the eye, the distance between two neighboring orientations of the array of plurality potential orientations is in the range of a pupil size of a user's eye based on the lighting conditions of the target environment, and the retinal display apparatus further comprises processing circuitry configured to adjust the distance between two neighboring orientations of the array of plurality potential orientations on the basis of an external brightness level.

2. The retinal display apparatus of claim 1, comprising for each of the plurality light beams an aperture for transmitting the light beam.

3. The retinal display apparatus of claim 1, wherein each of the plurality light beams is composed of a plurality of laser beams, each of the laser beams corresponding to a pixel of the image.

4. The retinal display apparatus of claim 1, configured to generate the plurality light beams by splitting a primary light beam into the plurality light beams.

5. The retinal display apparatus of claim 1, comprising for each of the plurality light beams a reflector configured to reflect the respective light beam into a direction corresponding to one of the plurality potential orientations of the eye.

6. The retinal display apparatus of claim 5, wherein the reflector is a free-form reflector.

7. The retinal display apparatus of claim 5, wherein the reflector is semi-transparent.

8. The retinal display apparatus of claim 1, comprising for each of the light beams a prism, configured to compensate a rotation of the respective light beam.

9. The retinal display apparatus of claim 8, wherein each of the prisms has a bottom face which is coated with a reflective material.

10. The retinal display apparatus of claim 1, comprising one or more beam expanders.

11. The retinal display apparatus of claim 1, wherein the retinal display apparatus further comprises one or more optical path equalizers configured to adjust the optical paths of the plurality light beams to an optical path associated with the image.

12. A near eye display apparatus comprising at least one retinal display apparatus for generating an image on the retina of an eye of a user, wherein the retinal display apparatus is configured to generate a plurality of light beams, each light beam conveying an instance of the image, and wherein the plurality light beams correspond one-to-one to a plurality of orientations of the eye of the user,
   wherein the plurality potential orientations of the eye define a hexagonal array on the eye, the distance between two neighboring orientations of the array of plurality potential orientations is in the range of a pupil size of a user's eye based on the lighting conditions of the target environment, and the near eye display apparatus further comprises processing circuitry configured to adjust the distance between two neighboring orientations of the array of plurality potential orientations on the basis of an external brightness level.

13. A retinal display method comprising:
generating an image on the retina of an eye of a user by generating a plurality of light beams, each light beam conveying an instance of the image, wherein the plurality of light beams correspond one-to-one to plurality potential orientations of the eye of the user,
wherein the plurality potential orientations of the eye define a hexagonal array on the eye, the distance between two neighboring orientations of the array of plurality potential orientations is in the range of a pupil size of a user's eye based on the lighting conditions of the target environment, and t
adjusting the distance between two neighboring orientations of the array of plurality potential orientations on the basis of an external brightness level.

* * * * *